(No Model.)
W. NEWELL.
SAW GUMMER.
No. 261,249. Patented July 18, 1882.
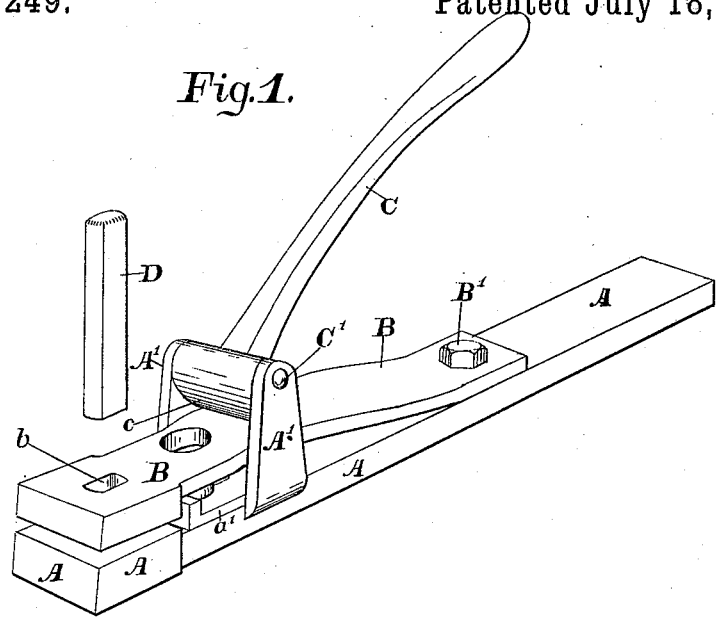
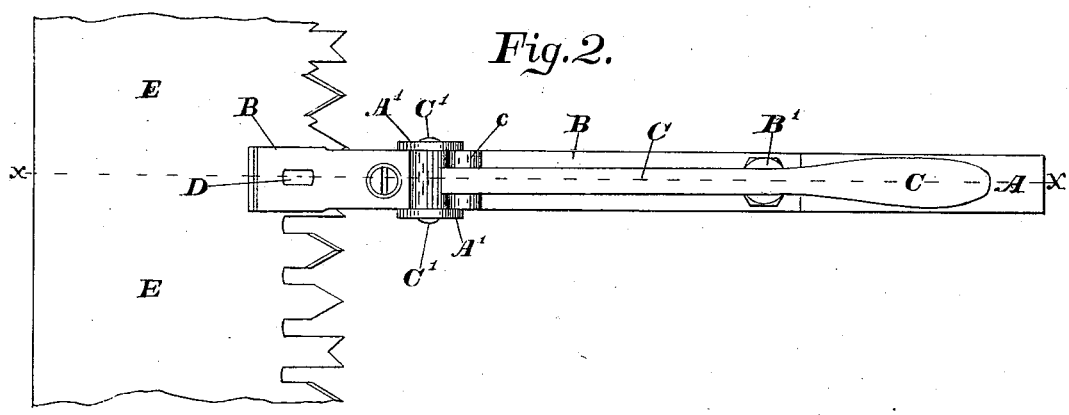
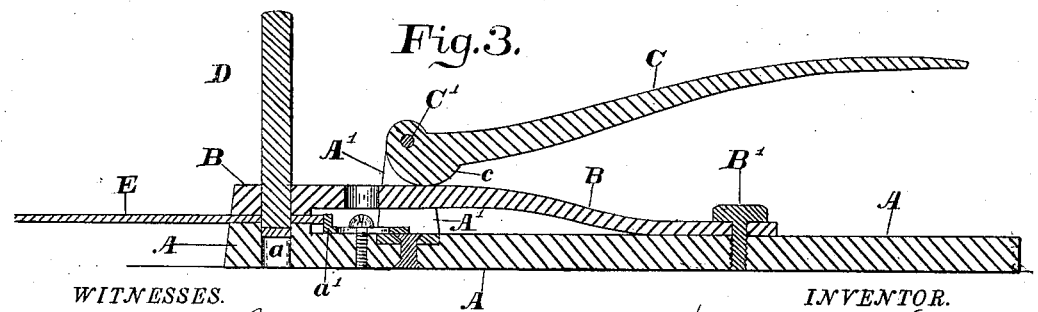
WITNESSES.
Chas. N. Leonard.
Chas. L. Thurber.
INVENTOR.
William Newell,
PER
C. Bradford,
ATTORNEY.

UNITED STATES PATENT OFFICE.

WILLIAM NEWELL, OF BUTLER TOWNSHIP, MIAMI COUNTY, INDIANA.

SAW-GUMMER.

SPECIFICATION forming part of Letters Patent No. 261,249, dated July 18, 1882.

Application filed March 17, 1882. (No model.)

*To all whom it may concern:*

Be it known that I, WILLIAM NEWELL, of the township of Butler, county of Miami, and State of Indiana, have invented certain new and useful Improvements in Saw-Gummers, of which the following is a specification.

The object of my said invention is to produce a saw-gummer for the use of farmers, lumbermen, and others which can be conveniently used in any place, and shall be simple in construction and inexpensive. This object is accomplished by the construction and combination of parts hereinafter particularly described and claimed.

Referring to the accompanying drawings, which are made a part hereof, and on which similar letters of reference indicate similar parts, Figure 1 is a perspective view of my improved saw-gummer; Fig. 2, a top or plan view of the same when in position for use on a saw, and Fig. 3 a longitudinal vertical section on the dotted line $x$ $x$.

In said drawings, the portions marked A represent the base of my improved gummer; B, the top or clamp portion; C, a cam-lever by which the clamp portion is forced down toward or upon the base portion; D, the male portion of the die, by which the saw is gummed; and E, a section of saw.

The base A is a stout metallic bar having in its forward end an orifice, $a$, which serves as the female portion of the die, and is provided with the arms A' A', in which are bearings for the pivot C', whereon the cam-lever moves.

The top or clamp portion, B, consists of a body in the form of a stout spring secured at its rear end to the base A by the bolt B' or other suitable means, and has its front end enlarged into the form of a head, in which is the orifice $b$, corresponding to the orifice $a$ in the base A, and which serves as a guide for the male portion D of the die.

The lever C is provided with the cam-face $c$, and is mounted on the pivot C' in such relation that when forced down, as shown in Figs. 2 and 3, it will force the part B down and tightly clamp the saw placed between said part B and the part A. When raised it occupies the position shown in Fig. 1 and allows the jaws of the device to remain separated.

The male portion D of the die is in the general form of a punch, and is adapted to be driven through the orifices $a$ $b$ by a hammer or in any other suitable manner, and cuts or punches a portion from the saw at the roots of the teeth, thereby lengthening said teeth to the desired degree.

The operation of my said invention is as follows: The saw E is first placed between the jaws A and B, its teeth preferably resting against the gage $a'$ and one of its teeth on either side of the orifice $a$. The lever C is then operated and the part B clamped down tight thereon. The male or punch portion D of the die is then inserted in the orifice $b$ and a smart blow from a hammer struck thereon, which cuts a piece out of the saw and "gums" or lengthens the teeth. The saw-plate, being tightly clamped between the two jaws of the gummer, cannot be kinked or bent by this operation, and therefore by the use of this device the user of the saw is saved the expense of sending his saw to a saw-maker, being able to do the work himself as quickly and in a manner which answers all purposes.

I am aware that a saw-gummer in some respects similar to mine, but more expensive and less convenient, has been produced. I therefore desire to be understood as confining myself closely to the construction specified.

Having thus fully described my said invention, what I claim as new, and desire to secure by Letters Patent, is—

The combination of the base A, provided with an enlarged head at its front end, in which is an orifice, $a$, and having a gage, $a'$, attached to its body just back of said head, the clamp portion B, secured to said base A by a bolt, B', and provided with a similar head to that on said base, in which is an orifice, $b$, corresponding to and in line with the orifice $a$, the clamping-lever C, and the punch-die D, all substantially as shown and described, and for the purposes specified.

In witness whereof I have hereunto set my hand and seal, at Indianapolis, Indiana, this 13th day of March, A. D. 1882.

WILLIAM NEWELL. [L. S.]

In presence of—
C. BRADFORD,
CHAS. L. THURBER.